April 2, 1957
G. B. ROESCH
2,787,168
BRAKE CONTROL MECHANISM
Filed April 12, 1954
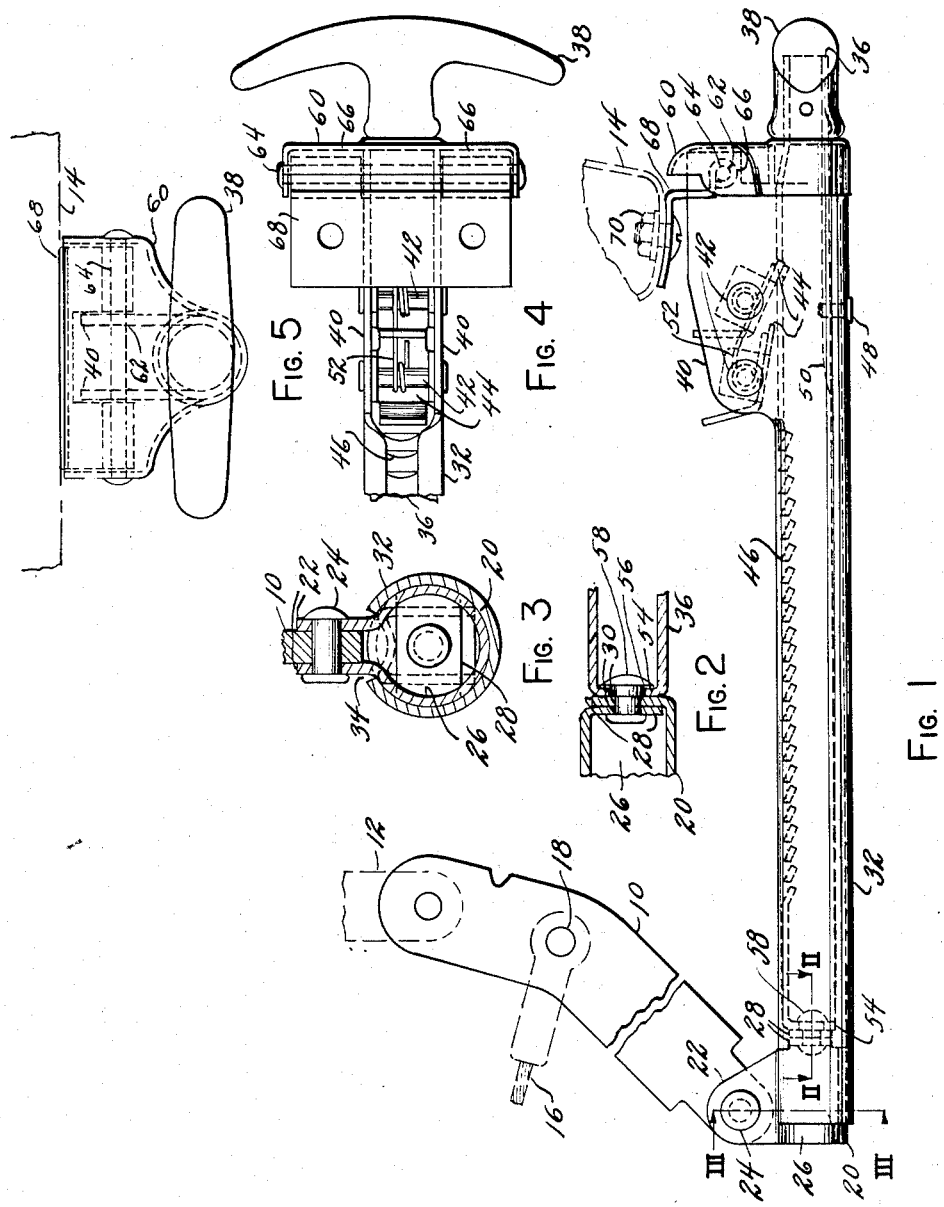

United States Patent Office 2,787,168
Patented Apr. 2, 1957

2,787,168

BRAKE CONTROL MECHANISM

George B. Roesch, Toledo, Ohio, assignor to The Rush Stamping Company, Toledo, Ohio, a corporation of Ohio Application April 12, 1954, Serial No. 422,411

5 Claims. (Cl. 74—503)

This invention relates to brake operating mechanisms for motor vehicles.

An object of this invention is to provide a manually operable mechanism for control of the emergency or parking brakes on a motor vehicle, which mechanism employs a manually reciprocable and rotatable pull rod as the primary control element.

Another object of this invention is to provide an effective mounting means for the pull rod.

Another object of this invention is to provide a novel mechanism of cooperating parts.

And another object of this invention is to provide an economical assembly of effectively operating parts comprised entirely of stampings and standard fastening elements.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the brake operating mechanism showing its method of assembly with a motor vehicle;

Fig. 2 is a view on the line II—II, Fig. 1;

Fig. 3 is a view on the line III—III, Fig. 1;

Fig. 4 is a plan view of the dashboard mounting for the device; and

Fig. 5 is a side elevation taken from the right of Fig. 4.

In many current styles of motor vehicles, the emergency or parking brakes are so designed as to include a lever 10 swivelly attached to a fixed bracket 12 positioned forwardly of the dash 14. This type of mechanism usually includes a brake operating cable 16, having one end thereof fixedly attached by a suitable fastening element 18 to an intermediate portion of the lever 10.

The invention herein is directed to a novel mechanism for operating the lever 10, and to this end a clevis 20 is attached to the lever end remote from the bracket 12, which clevis includes a pair of ears 22 engaging the lever 10 therebetween and swivelly attached thereto by a rivet-like element 24. The ears 22 are extensions from the clevis body 26, herein shown as a tubular or cylindrical portion having a pair of integral overlapping flanges or offsets 28 on one end thereof, diametrically extending across the tubular portion and provided with registering eyes 30 therethrough.

This clevis is reciprocably mounted in a tubular mounting element 32 with the ears extending outwardly therefrom through slot 34 longitudinally extending along the side of said holder. The cylindrical holder 32 also provides a mount for a channel-shaped pull rod 36, which pull rod is rotatable and reciprocable therein as manually controlled by handle 38 attached to the forward end of the rod 36. The holder 32 is provided with a pair of outwardly projecting opposing flanges 40 adjacent the handle 38, which flanges mount pins 42 as fulcrum mounts for pawls 44. These pawls coact with teeth 46 in the web of the rod 36, and as the handle 38 is pulled outwardly from the mechanism, the pull rod teeth will engage the pawls for incremental holding of the pull rod 36 relatively to its support 32.

Thus, as the handle is drawn away from or out of the support, the lever 10 will in turn be swung to pull the cable 16 and thus operate the brakes to which the cable may be attached. To release the brakes it is only necessary to rotate the handle 38, so that the teeth 46 are shifted clear of the pawls 44, and the pull on the cable will cause the pull rod to be withdrawn into the holder. As the pull rod approaches full telescoped position within the support, pin 48 fixed in the holder 42 will be engaged by a cam portion 50 on the rod 36, and the pull rod 36 is reset with the teeth 46 in alignment with the pawls 44. Spring means 52, coacting with the pawls 44, normally urge such pawls into teeth engagement. This construction is more clearly disclosed in my copending application Serial No. 407,843, filed February 3, 1954, of which this application is a continuation in part.

The pull rod 36 adjacent the clevis 26 is provided with an inwardly extending flange 54 abutting the flanges 28, and this flange 54 is provided with an eye 56 in registry with the eyes 30 in the flanges 28. A rivet-like element 58 is loosely set to extend through the eyes 30, 56 to loosely lock the pull rod 36 in alignment to and with the clevis body 26. Thus, when the pull rod is withdrawn from its mount, it moves the clevis 26 therewith to operate the lever 10, and the loose connection permits the swivel of the pull rod relatively to the clevis, which is held against rotation by the ears 22 in the slot 34.

It will be noted that in this lever operation there must be some vertical swing of the holder 32. To this end a stamping 60 is attached to the support 32 across the ends of the flanges 40, which flanges are provided with a pair of hinge pin mounting eyes 62 mounting hinged pin 64, which in turn also mounts hinge loops 66 carried by bracket 68, in turn mounted on the lower edge of the dash 14 by suitable fastening elements 70. This allows for a vertical swing of the pull rod mounting support 32 to compensate for the movement of the lever 10.

There is thus provided a brake operating mechanism which may be assembled from economical stampings and standard fastening elements with a minimum of operations, thus producing a mechanism with sufficient flexibility to operate the type of brake herein shown. The hinged mounting relative to the dash provides sufficient movement for the vertical shifting of the mechanism and the hinged pin 64 in extending through the flanges 40, locks the parts together, and the swivel connections disclosed allow a free and easy operation of the handle 38. The plate 62 may be configured to conceal the hinge pin assembly and serve as a trim about the handle 38.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. In brake operating mechanism of the class described including a lever having a brake cable attached thereto and extending therefrom, a clevis pivotably attached to said lever, said clevis including a cylindrical portion including an integral flange across one end thereof, a reciprocable and rockable pull rod including an integral flange across the terminal thereof abutting said clevis flange, a rod and clevis guiding and supporting member, a handle on said rod for manually operating said rod in said member, and a swivel connection between said abutting flanges.

2. In a hand brake operating mechanism, a tubular support, a reciprocable and rockable pull rod mounted in said support, a clevis mounted in said support in alignment with said pull rod, said clevis and pull rod having abutting flanges, a swivel connection between said flanges, said support having a slot therein, ears extending from said clevis through said slot, and a brake operating lever having one end thereof hingedly connected to said ears.

3. In a hand brake operating mechanism, a tubular support, means for mounting said support to the dash of a vehicle, a rockable and reciprocable pull rod mounted in said support, a handle on one end of said rod for manual control of said rod, a diametrically extending offset from the opposite end of said rod, means between said handle and offset coacting between said pull rod and support to lock said pull rod in increments of telescopic relationship therebetween, said support provided with a longitudinal slot, a clevis in said support in axial alignment with said pull rod, said clevis having a bow portion within said support and a pair of ears extending outwardly through said slot, a brake operating lever hingedly connected to said ears, said clevis having a diametrically extending plate portion across the bow end adjacent said pull rod, and a swivel connection between said clevis and pull rod offsets.

4. The structure set forth in claim 1 wherein the guiding and support member is attached to the dash of a vehicle by a hinge mount permitting vertical swing of the supporting member.

5. The structure set forth in claim 3 wherein the swivel connection between the opposing offsets is a rivet-like connection loosely attached thereto.

References Cited in the file of this patent
UNITED STATES PATENTS

| | | |
|---|---|---|
| 2,632,338 | Sandberg | Mar. 24, 1953 |
| 2,669,884 | Sandberg | Feb. 23, 1954 |
| 2,671,353 | Hinsey | Mar. 9, 1954 |
| 2,682,178 | Powell | June 29, 1954 |